US012785295B2

(12) United States Patent
Yildirim

(10) Patent No.: US 12,785,295 B2
(45) Date of Patent: Nov. 3, 2026

(54) CABLE CONNECTOR

(71) Applicant: Murat Yildirim, Aurora, CO (US)

(72) Inventor: Murat Yildirim, Aurora, CO (US)

( * ) Notice: Subject to any disclaimer, the term of this patent is extended or adjusted under 35 U.S.C. 154(b) by 522 days.

(21) Appl. No.: 18/168,412

(22) Filed: Feb. 13, 2023

(65) Prior Publication Data

US 2023/0261395 A1 Aug. 17, 2023

Related U.S. Application Data

(60) Provisional application No. 63/309,478, filed on Feb. 11, 2022.

(51) Int. Cl.

| | |
|---|---|
| ***H01R 4/2433*** | (2018.01) |
| ***H01R 13/508*** | (2006.01) |
| ***H01R 24/38*** | (2011.01) |
| ***H01R 24/64*** | (2011.01) |

(52) U.S. Cl.

CPC ......... *H01R 4/2433* (2013.01); *H01R 13/508* (2013.01); *H01R 24/38* (2013.01); *H01R 24/64* (2013.01); *H01R 2201/04* (2013.01)

(58) Field of Classification Search

CPC .... H01R 4/2433; H01R 13/508; H01R 24/38; H01R 24/64; H01R 2201/04; H01R 24/58; H01R 24/86

See application file for complete search history.

(56) References Cited

U.S. PATENT DOCUMENTS

| | | | | |
|---|---|---|---|---|
| 2,749,526 A * | 6/1956 | Petersen | ................ | H01R 13/22 439/668 |
| 3,193,636 A * | 7/1965 | Daniels | .................. | H01R 39/64 439/26 |
| 3,333,232 A * | 7/1967 | Patton, Jr. | .............. | H01R 24/38 29/854 |
| 3,497,866 A * | 2/1970 | Patton, Jr. | .............. | H01R 24/38 439/668 |
| 3,626,356 A * | 12/1971 | Trammell | ............ | H01R 13/523 439/668 |
| 3,665,509 A * | 5/1972 | Elkins | .................. | H01R 13/523 439/271 |
| 3,725,847 A * | 4/1973 | Guneratne | ............. | H01R 24/38 374/E7.005 |

(Continued)

FOREIGN PATENT DOCUMENTS

| | | |
|---|---|---|
| CN | 102809785 A | 12/2012 |
| EP | 0080295 A1 | 6/1983 |

(Continued)

*Primary Examiner* — Travis S Chambers

(57) ABSTRACT

A cable connector includes a male connector and a female connector. The male connector has a plurality of contacts disposed perimetrically or circumferentially coaxially along major axes of at least one peripheral surface or perimeter of the male connector. The female connector has a plurality of contacts disposed complementarily coaXially along major axes of at least one interior peripheral surface or perimeter of the female connector. Insertion of the male connector into the female connector allows for greater connectivity between cables because more contacts are accommodated coaXially along the connector length than the transverse dimension, as currently seen in the art. Greater bandwidth is therefore accommodated over a greater number of channels.

6 Claims, 15 Drawing Sheets

(56) References Cited

U.S. PATENT DOCUMENTS

| | | | | | |
|---|---|---|---|---|---|
| 3,831,133 | A | * | 8/1974 | Grundfest | H01R 24/00 439/752 |
| 3,860,312 | A | * | 1/1975 | Gordon, Jr. | H01R 39/64 439/31 |
| 4,239,325 | A | | 12/1980 | Tyson | |
| 4,279,466 | A | | 7/1981 | Makuch et al. | |
| 4,421,371 | A | * | 12/1983 | Clark | H01R 13/631 439/249 |
| 4,448,482 | A | | 5/1984 | Lathlaen | |
| 4,520,558 | A | | 6/1985 | Bunnell | |
| 4,690,482 | A | | 9/1987 | Chamberland et al. | |
| 4,808,127 | A | | 2/1989 | Swanic | |
| 4,854,664 | A | | 8/1989 | McCartney | |
| 4,941,349 | A | | 7/1990 | Walkow et al. | |
| 5,207,596 | A | | 5/1993 | Tran | |
| 5,378,161 | A | * | 1/1995 | Loder | H01R 12/714 439/62 |
| 5,409,403 | A | * | 4/1995 | Falossi | H01R 24/38 439/736 |
| 5,467,420 | A | | 11/1995 | Rohrmann et al. | |
| 5,478,252 | A | | 12/1995 | Lecomte et al. | |
| 5,906,511 | A | | 5/1999 | Bozzer et al. | |
| 6,080,007 | A | | 6/2000 | Dupuis et al. | |
| 6,250,949 | B1 | | 6/2001 | Lin | |
| 6,553,166 | B1 | | 4/2003 | Caldwell | |
| 7,038,138 | B2 | | 5/2006 | Laity et al. | |
| 7,214,884 | B2 | | 5/2007 | Kenny et al. | |
| 7,220,919 | B2 | | 5/2007 | Kenny et al. | |
| 7,249,974 | B2 | | 7/2007 | Gordon et al. | |
| 7,425,142 | B1 | | 9/2008 | Putz | |
| 7,441,062 | B2 | | 10/2008 | Novotney et al. | |
| 7,484,993 | B2 | | 2/2009 | Amidon et al. | |
| 7,658,648 | B2 | | 2/2010 | Aekins | |
| 7,713,081 | B2 | | 5/2010 | Chen | |
| 7,824,216 | B2 | | 11/2010 | Purdy | |
| 7,946,885 | B2 | | 5/2011 | Amidon et al. | |
| 8,288,986 | B2 | | 10/2012 | Flack | |
| 8,313,336 | B2 | * | 11/2012 | Bondo | H04R 25/556 439/324 |
| 8,425,260 | B2 | | 4/2013 | Seefried et al. | |
| 8,702,444 | B2 | | 4/2014 | Maranto et al. | |
| 8,932,084 | B2 | * | 1/2015 | Thackston | H01R 13/5227 439/676 |
| 8,968,024 | B2 | | 3/2015 | Maranto et al. | |
| 9,203,184 | B1 | * | 12/2015 | Hui | H01R 13/629 |
| 9,337,572 | B2 | | 5/2016 | Maranto et al. | |
| 9,461,405 | B2 | * | 10/2016 | Endo | H01R 13/6315 |
| 9,543,670 | B2 | | 1/2017 | Montena | |
| 9,601,885 | B2 | | 3/2017 | Fransen | |
| 9,685,742 | B2 | * | 6/2017 | Liu | H01H 37/002 |
| 9,960,559 | B2 | * | 5/2018 | Pratt | H01R 13/631 |
| 10,559,931 | B2 | * | 2/2020 | Reed | H01R 33/7635 |
| 10,581,191 | B2 | * | 3/2020 | Feldchtein | H01R 13/44 |
| 11,374,354 | B2 | * | 6/2022 | Semik | H01R 13/642 |
| 2010/0291802 | A1 | * | 11/2010 | Sawai | H01R 43/24 439/660 |
| 2012/0094553 | A1 | * | 4/2012 | Fujiwara | H01R 24/58 439/891 |
| 2012/0282818 | A1 | | 11/2012 | Caveney et al. | |
| 2013/0040469 | A1 | * | 2/2013 | Hsu | H01R 13/6205 439/39 |
| 2015/0099391 | A1 | * | 4/2015 | Hashimoto | H01R 13/629 439/380 |
| 2021/0344126 | A1 | | 11/2021 | Novak et al. | |
| 2023/0261395 | A1 | * | 8/2023 | Yildirim | H01R 24/38 439/418 |

FOREIGN PATENT DOCUMENTS

| | | | |
|---|---|---|---|
| EP | 0320236 | A2 | 6/1989 |
| WO | 2008125813 | A1 | 10/2008 |

* cited by examiner

CABLE CONNECTOR

BACKGROUND OF THE INVENTION

Data cables are familiar in the art. All require connectors of some type to interconnect cables and to connect said cables into other cables, hardware, or wall jacks. Connectors typically employ conductive contacts, or insulation piercing contacts (IPCs), to which wires or conductors, run inside an insulating sheath comprising the cable, are soldered or attached. The IPCs are disposed in specific arrangements to ensure contact is maintained between the IPCs disposed in a male connector against those disposed in a female connector.

Size constraints and geometry limit the number of lPCs that can be properly configured for this contact-to-contact relationship—each IPC must be insulated from its neighbor (s) while securely maintaining connection with a complementary IPC in the other connector or jack, as case may be, in such a way as to ensure direct and exclusive conductivity.

Bandwidth is therefore constrained by the number of IPCs and the size of the conductors comprising the cable. Packets of data are constrained by the number of contacts since an electric signal must travel through at least two complementary contacts for the data to be transmitted from one cable to another. While data may be bundled between discrete packets, represented in discrete electrical signals that are constructable along a common conductor, the maximum amount of data flow is nonetheless a function of the number of contacts at the connectors. As the internet of things (IoT) and the industrial internet of things (IIoT) ramps up in the coming age, where every device is communicating online, this physical constraint to bandwidth may present a concern. What is needed is a cable connector that enables transmission of data along a plurality of channels by maximizing the contact-to-contact relationship between cables.

Connectors seen in the present state of the art typically arrange a plurality of IPCs in a lateral or transverse fashion, typically along an edge of a parallelepiped insulated connector, which parallelepiped insulated connector is insertable into a rectangular wall jack, or other connector, with complementary array of IPCs. For example, the ATX connector enables a plurality of wires to connect into a series of pins for insertion into complementary sockets. Each pin, then, connects to one wire, and a plurality of pins are arranged serried for connection with opposing sockets. Registered Jacks, standard in present day telecommunications, likewise orient contacts along transverse planes for interconnection with complementary contacts in a female connector. The maximum number of contacts between connectors is therefore limited by the width of the connector; typically contacts are arranged along a transverse axis in one or two rows, one atop the other. Some registered jacks (such as the RJ21, for example) present elongate connectors, positioning a plurality of contacts serried in transverse rows at the cable end. This creates a geometric inefficiency—for a greater number of contacts, the connector itself must be enlarged or otherwise increased in size, requiring an equivalent increase in size of the female connector.

What is needed is a cable connector that enables a maximized number of contacts to interconnect between a male and female connector over a given area. What is needed is a cable connector that positions a plurality of contacts coaxially along or in parallel with a major axis of the connector, to maximize connections between contacts and thereby increase bandwidth for transmission of data across a plurality of channels.

FIELD OF THE INVENTION

The present invention relates to cable connectors, and more particularly, to a cable connector that positions a plurality of contacts coaxially disposed along a major axis of the connecter and/or cable, which contacts are configured to complementarily engage against a corresponding plurality of contacts disposed upon a complementary female connector which is configured to matingly receive the cable connector. The arrangement of the contacts enales an interconnection of the contacts for the transmission of more data, across a plurality of channels, than in the manner of orienting contacts presently seen in the art.

Further, branch cables may feed into a trunk cable conneting end-users to a common connection at a network switch or patch panel, for example, thereby lessening the number of individual cables connected at the switch or patch panel while preserving or increasing the number of channels along which data may be transmitted.

SUMMARY OF THE INVENTION

The coming Internet of Things ("IoT") heralds an era where almost every device is networked in communication with the world wide web. Vast quantities of data are already being produced and transacted in the modern word. As more and more devices are produced to be networked for internet compatibility, this vast transaction of data will only increase. Bandwidth—the amount of data that can be transmitted through a network—will exceed the physical limitations imposed by current network paths. Bandwidth limitations imposed by hardware will become increasingly in issue. For example, data cables seen in the art, which have limitations on the number of contacts that can be arranged between connecting cables, particularly at the home and office level, will become insufficient to accommodate the upward trends anticipated in the art.

The present cable connector, therefore, has been devised to orient a higher density of contacts along or in parallel with the major axis of the cable proper, to position a higher quantity of contacts in a longitudinal arrangement, thereby maintaining the diameter of the cable within acceptable ranges. The present cable connector, therefore, enables a greater interconnection between a higher number of contacts than in cables currently seen in the art while limiting the diameter required of the connector within acceptable norms. Further, the increased number of contacts allows for transmission of data across more channels and may, therefore, interconnect branch networks from is branch lines into a trunk line, to streamline the number of cables used in network between devices, end-user ports, and patch panels and network switches and/or gateways. The present invention enables a cascading series of connectors that interconnect upstream into trunk lines, thereby enabling simplified network configuration (with less end-to-end cables required) while increasing bandwidth transmissibility through the network.

The instant cable connecter, therefore, includes a plurality of contacts disposed along or in parallel with a major axis of the connecter, each of said contacts disposed about the peripheral surface of the connector and configured to complementarily engage against a corresponding plurality of contacts disposed upon a complementary connector configured to matingly receive the cable connector wherein interconnection of the plurality of contacts enables transmission of data across a plurality of channels as a function of the number of contacts.

In one example embodiment contemplated herein, a male connector is devised to engage into a female connector to interconnect a plurality of contacts. The male connector may include a plurality of nonconducting everted tiers, each of which tiers has a plurality of contacts arranged around the perimeter or peripheral surface thereon. Each of the tiers may be concentric, arranged around a common center, each tier having a decreasing transverse dimension (or, in circular connector embodiments, a decreasing diameter). In such embodiments, the male connector matingly engages into a female connector, configured to matingly receive the male connector. The female connector includes at least one non-conductive inverted tier configured complementarily to the at least one everted tier of the male connector. A plurality of contacts is arranged around the interior perimeter or peripheral surface of the at least one inverted tier in corresponding positions devised to engage against each contact of the male connector when the male connector is interconnected with the female connector.

By geometrically aligning the contacts in positions along or in parallel with the cables' major axes, instead of stacking them or orienting them transversely as is currently seen in the state of the art, the instant cable connector interconnects an increased number of contacts while controlling the overall diameter or transverse dimension of the cable and/or connector. The present connector therefore enables transmission of more bandwidth across a plurality of channels while maintaining compact transverse dimensions. This provides more conductors and contacts for connection within a given volume, enabling more efficient network structures employing fewer individual cables.

The number of contacts that can be arranged around a perimeter or a peripheral surface of a connector is a function of the perimeter of the connector (and therefore the connector's transverse dimension, or diameter) as well as its coaxial length. In an example embodiment contemplated herein, the male connector comprises a single everted tier having a length to define an exposed peripheral surface whereon a plurality of contacts may be disposed. A corresponding inverted, female tier, having a coaxial length and an interior peripheral surface wherein a plurality of contacts is disposed in complementary position to the plurality of contacts upon the peripheral surface of the everted tier, enables interconnection for data transmission. In the single-tiered embodiment contemplated by this example, the length of the tier on each of the male and female connectors controls the number and size of contacts disposed for interconnection.

In another example embodiment illustratively set forth herein, the male connector comprises a plurality of everted tiers, each tier representing a decreased diameter relative to a preceding tier, from a maximum diameter (which may be approximate to the diameter of the cable proper or may be larger or smaller than the diameter of the cable proper, as case may be), to a minimum diameter. For example, a first tier, therefore, may have a maximum diameter that includes a first plurality of contacts disposed about the perimeter or peripheral surface of the first tier. A second tier, for example, everted from the first tier, may have a lesser diameter than that of the first tier, but a diameter that is greater than the diameter of a third tier, and therefore presents a second plurality of contacts about its perimeter or peripheral surface that is less in number than the first tier but greater in number than the third tier. The third tier, therefore, may present a minimum diameter and, in like capacity, the least number of contacts disposed upon its perimeter or peripheral surface. Additional tiers are contemplated herein.

In this example, the first, second, and third tier may, therefore, insert into a series of concentrically aligned inverted tiers disposed in the female connector, wherein the third tier seats into an innermost inverted tier, the second tier seats into an intermediate tier, and the first tier seats into an outermost tier of the female connector. The connectors may be configured to be releasably securable together, as, for example, by action of sprung attachment members that are moveable between a first position and a second position against a tension or force, or by action of a collar member configured to rotatably secure one connector to another by manual action, or by other means of attachment seen in the art.

Further, it is axiomatic that different sized and/or different types of contacts may be disposed upon each tier, whereby the number of contacts may be a function of the size and/or type of the contacts disposed upon the peripheral surface. That is, in some embodiments contemplated herein, the number of contacts may be lesser on the larger tiers due to a larger size of the contacts. Also, the converse may be true.

It should be understood that additional types of contacts may be employed in a single connector, singly or in combination. Thus, it is contemplated that a single connector may include connectivity enabling transfer of data over conductors, fibers, fiber optics, electrically, optically, magnetically, or electromagnetically, or any combination thereof, whereby a single connector is enabled to transfer data across a plurality of channels.

Thus, the number of contacts depends on the type, number, length, and transverse dimension (or diameter), of each tier as well as the size of the contacts themselves.

The present cable connector has been configured to enable ease of interconnection. Smaller cables can further be routed into larger, trunk cables. Interconnection of hundreds of connections, for example, is rendered possible in a single connection, reducing time to install or relocate a network.

Thus, has been broadly outlined the more important features of the present concentric cable connector so that the detailed description thereof that follows may be better understood and in order that the present contribution to the art may be better appreciated.

Objects of the present concentric cable connector, along with various novel features that characterize the invention are particularly pointed out in the claims forming a part of this disclosure. For better understanding of the concentric cable connector, its operating advantages and specific objects attained by its uses, refer to the accompanying drawings and description.

GLOSSARY OF TERMS

In order that the intended scope of the accompanying claims may be better understood, the inventor sets forth the following glossary of terms with meaning as intended and applied herein.

Attachment Member: Any means by which a male connector may be selectively secured to a female connector, and vice versa, including clips, hooks, hook and loop, sprung members, tensioned members, rotating members, threaded members, extensible members, collars, gates, pins, snaps, etc.

Bridge Contact: Any conductive body disposed between a conductor and a contact, as defined herein.

Channel: Any unique data transmission that is identifiable or constructable from other unique data transmissions and transmissible along a discrete data path. Channels may include alternative or alternate forms of transmission across mutually exclusive or independent conductors, such as transmission effectuated electrically, optically, magnetically, or electromagnetically.

Conductor/Conductive: Any conduit, body, channel, delimit, or extent, over which data or bandwidth may be transmitted from at least a first point to a second point. In its broadest reasonably interpretation, the term "conductor" as applied herein should be taken to include wire, conductive elements, fiber, fiber optics, and other physical delimits or extents wherein data or bandwidth is transmissible, either electrically, optically, or via controlled transmission of electromagnetic radiation or electrical signals.

Contact: Any means by which a terminus of one conductor is brought to a position for connection or operational communication with a complementary contact disposed upon another conductor whereby data transmission form one conductor to another is enabled.

Nonconductor/Nonconductive: Any body, delimit, or extent which is not a conductor or conductive, according to the definition above. Any body which is an insulator (contrary to conduction via electrical or electromagnetic means) or opaque (contrary to conduction by optical means) or nonmagnetic (contrary to conduction via magnetic means).

DETAILED DESCRIPTION OF THE DRAWINGS

With reference now to the drawings, and in particular FIGS. 1 through 27 thereof, examples of the instant cable connector employing the principles and concepts of the present cable connector and generally designated by the reference number 10 will be described.

It is to be understood that the example embodiments depicted in the accompanying drawings are included to exemplify the novel and inventive features of the instant invention and are not intended to be limiting. The particular features are enumerated as example embodiments only, illustrative of scope intended by the accompanying claims. Thus, various exemplary embodiments are set forth illustrative of the overall concepts informing the invention whereby persons skilled in the art may better comprehend the scope implied by the claims. It should be recognized, therefore, that a plurality of tiers and other arrangements of parts depicted may be variously employed in alternative and alternate arrangements, shapes, configurations, lengths, depths, and adaptations, the overall concept of the cable connector notwithstanding. It is to be further understood that the term "concentric" as employed herein throughout includes embodiments wherein the conductors and/or contacts are arranged concentrically, whether across a plurality of tiers or not.

Figure 1:
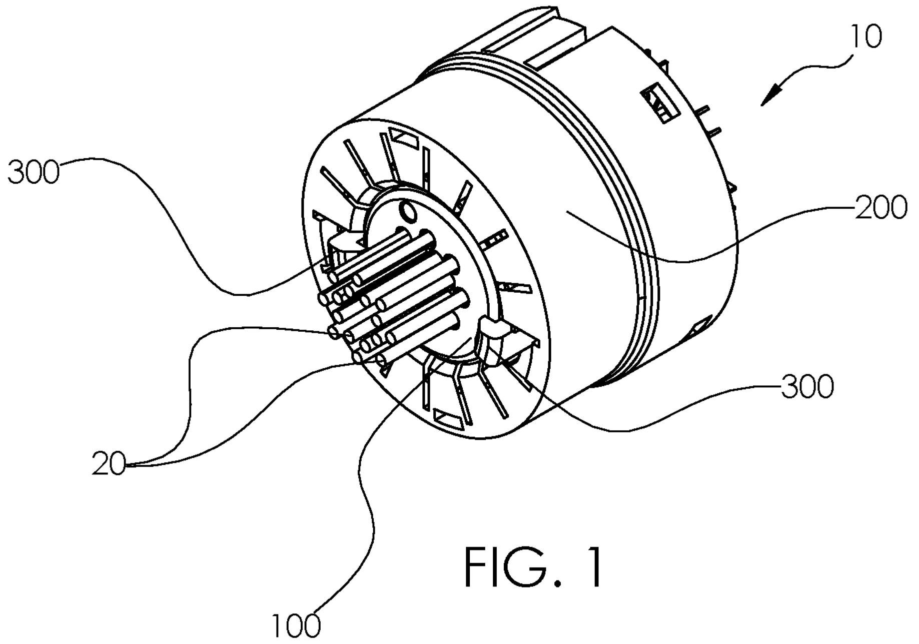
FIG. 1 is an elevation view of an example embodiment of a cable connector with the cable removed, illustrating male connector inserted into a female connector.

Turning now to FIG. 1, an example embodiment of the instant cable connector 10 is illustrated in elevation view with sheathing of cable removed to illustrate the interior conductors 20 (wires, fibers, fiber optics, or channels, or other means or combinations of means by which data or bandwidth may be selectively transmitted between at least two locations). Male connector 100 is shown connected inserted into female connector 200. In this example embodiment, attachment members 300 releasably secure male connector 100 in complementary engagement with female connector 200.

Figure 2:
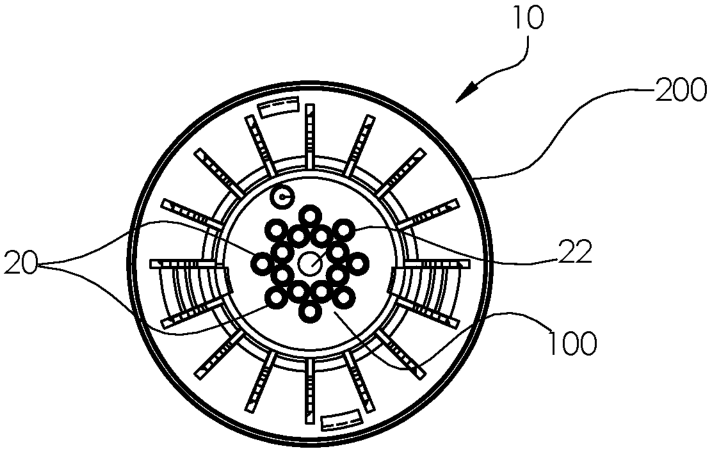
FIG. 2 is an end view of the example embodiment of FIG. 1.

FIG. 2 illustrates the same example embodiment as shown in FIG. 1, in rear elevation view. The plurality of conductors 20 (or, as mentioned previously, wires, fibers, fiber optics, or channels, or other bodies or conveyances or combinations of bodies or conveyances suited to the transmission of data or bandwidth, whether electrically, magnetically, or electromagnetically) are shown on end with exterior sheathing removed. In this example embodiment, for the purposes of illustration only, there are sixteen conductors 20 terminating in male conductor 100. A seventeenth conductor 22 may likewise be included, centrally disposed therein. In an example embodiment contemplated herein, the sixteen conductors 20 are contemplated to be copper or electrical conductors and the central conductor 22 is contemplated to be fiber optic. However, the reverse or alternative or different arrangements are contemplated as within scope of this disclosure, the foregoing illustrated for purposes of example only.

More or less conductors 20 may be arranged between insulating or nonconductive sections, as case may be, depending on the size of the conductors 20 compared to the size of the connector 100, 200. The number, therefore, is shown for the purposes of example only and is not intended to be limiting. Each of the conductors 20 is disposed via peripheral contact 102 to connect with a corresponding spring contact 202 disposed in complementary position interior to female connector 200. See, e.g., FIG. 4.

Figure 3:
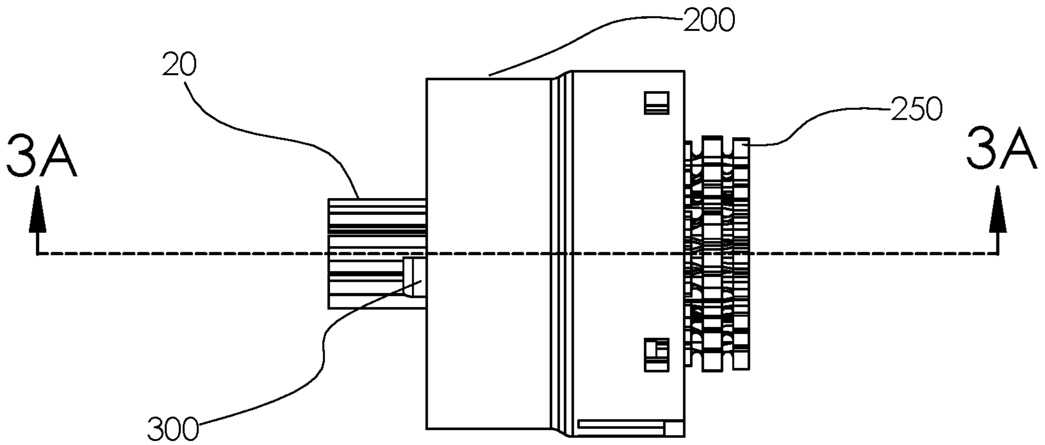
FIG. 3 is a side view of the example embodiment of FIG. 1.
Figure 4:
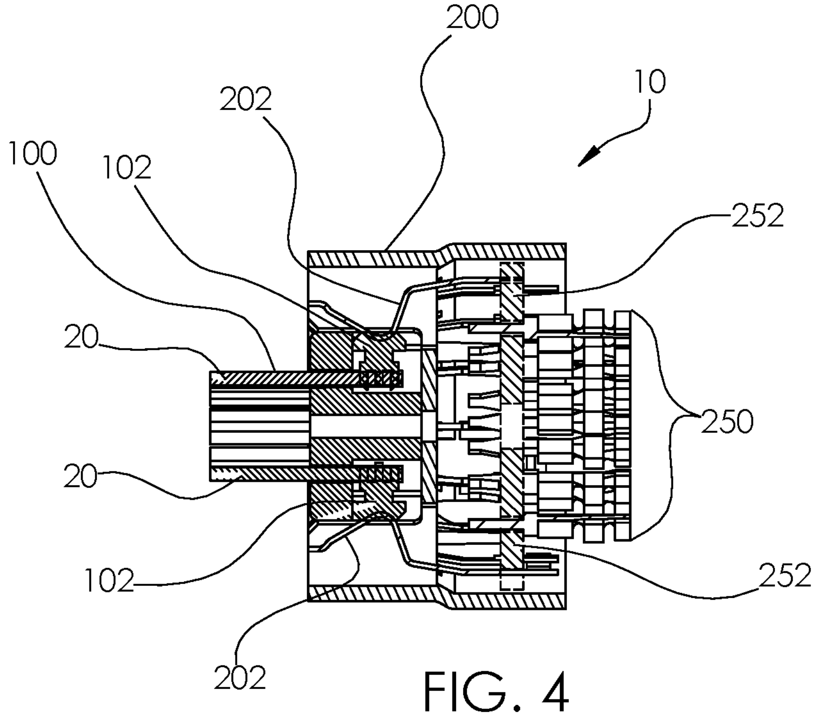
FIG. 4 is a longitudinal section taken along the line 3A-3A of FIG. 3.

FIG. 3 illustrates a side elevation view of the example embodiment shown in FIGS. 1 and 2. Female connector 200 includes collar members 250 disposed to orient complementary conductors 20 disposed terminating interior to female connector 200 to connect with associated spring contacts 202 which in turn contact with peripheral contacts 102 disposed upon or protruding from peripheral surface 104 of male connector 100. As shown in FIG. 4, in longitudinal section taken along the line 3A-3A in FIG. 3, example embodiment of male connector 100 includes wedge or plate peripheral contacts 102, crimped or connected endwise to associated conductors 20, to dispose contact 102 presented at, upon, proximal to, or emerging from peripheral surface 104 of male connector 100.

When male connector 100 is properly oriented, such that attachment members 300 properly engage to maintain male connector 100 docked into female connector 200, then each peripheral contact 102 engages against an associated spring contact 202 peripherally disposed around interior surface 204 of female connector 200. As shown in FIG. 4, each spring contact 202 is connected by bridge connector 252 to a corresponding conductor 20 whereby signals (or data or bandwidth) is transmissible between conductors 20 in male connector 100 and female connector 200.

Figure 5:
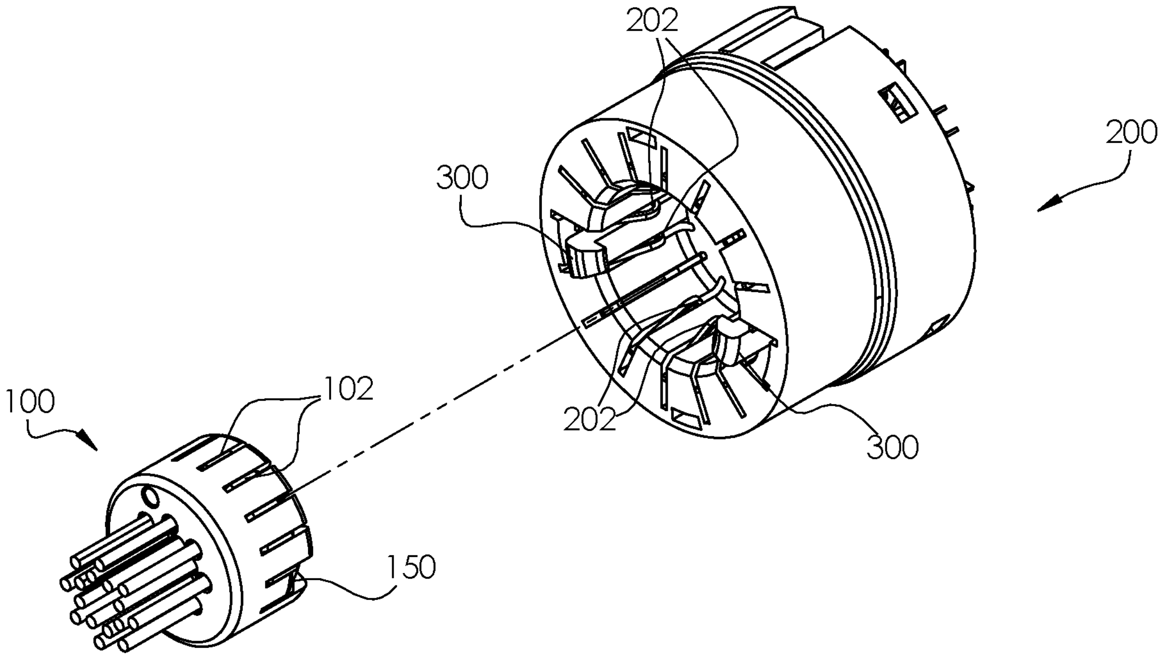
FIG. 5 is an elevation view of the example embodiment of FIG. 1 with the male connector separated from the female connector.

Turning to FIG. 5, male connector 100 is shown separated from female connector 200. Guide channels 150, peripherally disposed on male connector 100, assist proper alignment, orientation, and fastening of male connector 100 into female connector 200 by requiring passage of attachment members 300 therethrough. If guide channels 150 are not aligned with attachment members 300, then interconnection will be physically prevented by attachment members 300 obstructing connection. In other words, in this example embodiment, attachment members 300 must align with guide channels 150 to connect with male connector 100. Additional means of selectively securing interconnection of male and female connector 100, 200 are contemplated as within scope of this disclosure, including, for example, hook and loop interfacing, hooks, clips, threads (wherein a partial rotation of the male connector relative to the female connector may effectuate mating contact), slidable collars devised to slidingly engage or lock male and female connectors 100, 200 together, among other mechanisms seen and contemplated in the art.

The example embodiment shown in FIGS. 1 through 5 presents a male connector 100 having a cylindrical shape (or circular cross-section) with a single peripheral surface 104 wherein peripheral contacts 102 are disposed. Similarly, female connector 200 has one interior surface 204 devised to matingly engage with male connector 100. However, additional means of effectuating contact between a plurality of conductors 200 along a coaxial dimension, wherein the diameter or transverse dimension of the connector 100, 200 need not exceed the diameter or transverse dimension of the corresponding cable upon which the connector is installed, are contemplated as within scope of this disclosure. For example, in the example embodiment shown in FIG. 6, a multi-tiered concentric connector 10 is contemplated, wherein a greater plurality of conductors 20 is enabled to be interconnected in contact around a plurality of peripheral surfaces 104 disposed therein. It should be noted that connectors having additional complementary shapes, such as square, rectangular, or polygonal cross-sections, for example, are contemplated as included within scope of this disclosure.

Figure 6:
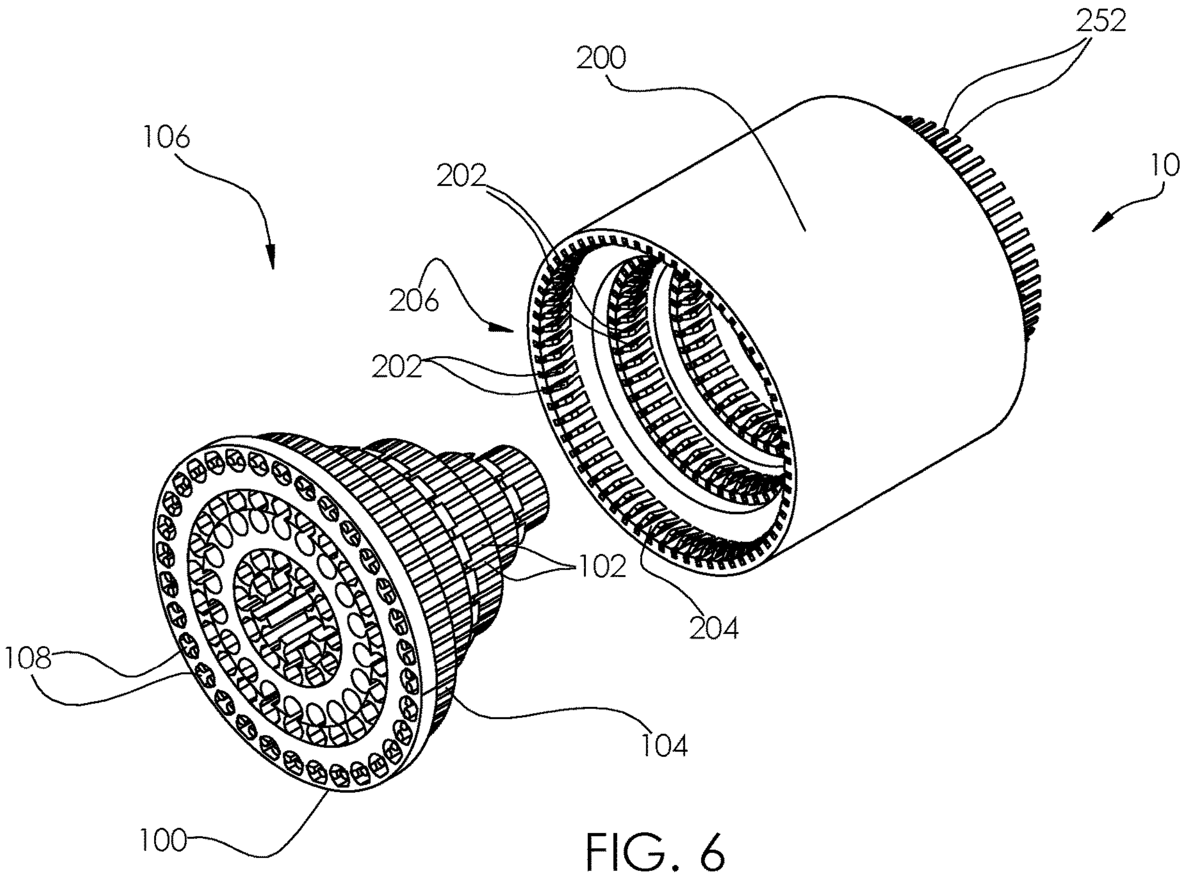
FIG. 6 is an elevation view of an example embodiment of a concentric cable connector having a five-tiered male connector and a five-tiered female connector.

As shown in FIG. 6, male connector 100 may include a plurality of everted tiers 106. In the example embodiment depicted, male connector 100 has five everted tiers, each of which present a peripheral or, in the example embodiment shown, circumferential surfaces 104 whereon a plurality of peripheral contacts 102 is disposed. For clarity of illustration, individual conductors 20 (wires, fibers, fiber optics, or channels, or other data or bandwidth conveyances) are not shown and exterior sheathing is likewise omitted.

Female connector 200 presents a complementary number of inverted tiers 206, each having an interior peripheral surface 204 whereon a corresponding plurality of, in this example embodiment, spring contacts 202 is disposed. When male connector 100 is inserted into female connector 200, each of the plurality of everted tiers 106 engages with each of the plurality of inverted tiers 206 whereby each of the plurality of peripheral contacts 102 is placed in contact or operational communication with each of the plurality of spring contacts 202.

In this example embodiment, a greater density of conductors 20 can be incorporated relative to the example embodiment shown in FIGS. 1 through 4 above. More bandwidth, across a greater variety of channels, may therefore be accommodated through the example embodiment shown in FIG. 7. Of course, more or less tiers can increase or decrease the number or type of conductors 20 so arranged for data transmission.

Figure 7:
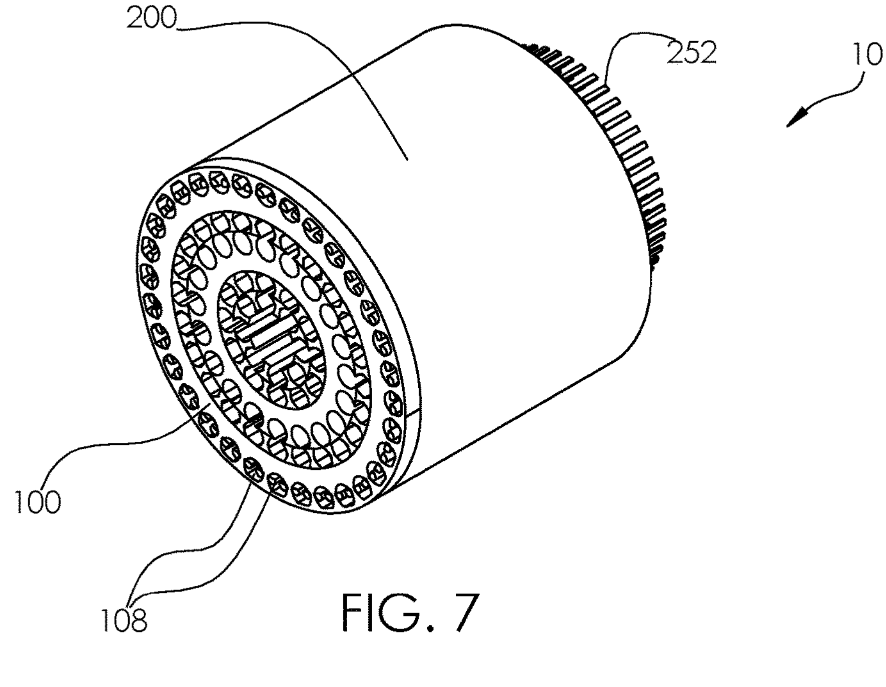
FIG. 7 is an elevation view of the embodiment shown in FIG. 6 with the male connector inserted into the female connector.

FIG. 7 illustrates the example embodiment shown in FIG. 6 with male connector 100 inserted into female connector 200. As shown in FIG. 6, for clarity in representation, conductors 20 and exterior sheathing are omitted. Male and female connectors 100, 200 may be secured in position by means of a collar member (not shown) or other means of selective attachment devised to selectively maintain insertion of male connector 100 into female connector 200, or other attachment members (not shown) may be employed.

Figure 8:
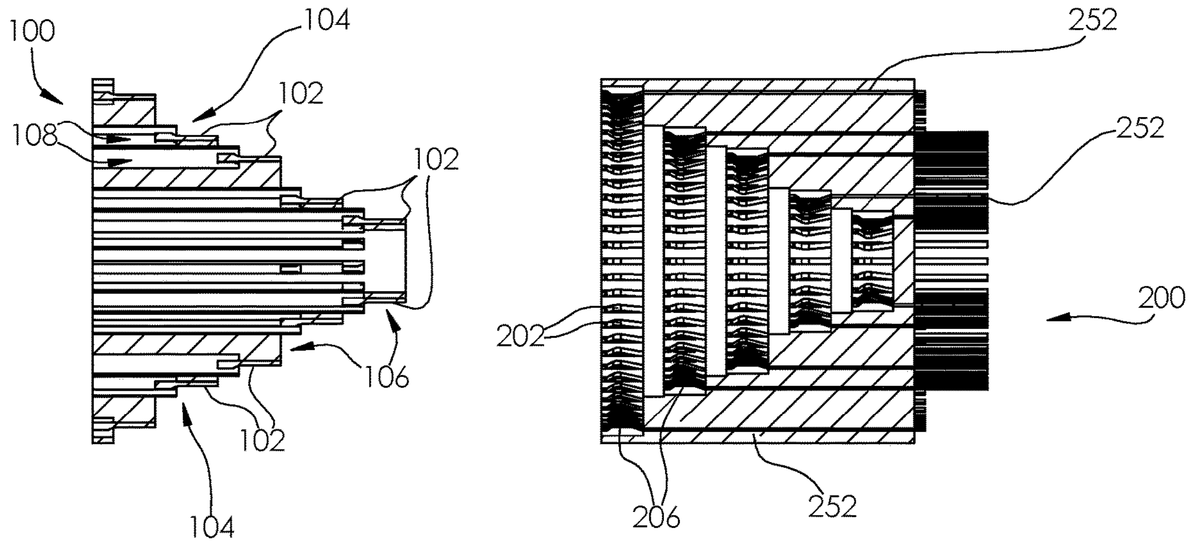
FIG. 8 is a side elevation view of a longitudinal section taken along a medial axis of the embodiment shown in FIG. 6.

FIG. 8 illustrates a side elevation view of a longitudinal section taken along a medial axis of the embodiment shown in FIG. 6. Again, conductors 20 and sheathing that would ordinarily inform each connector 100, 200, have been omitted from view for clarity in representation of the inventive features.

Male connector 100 presents a plurality of channels 108 wherein a corresponding plurality of conductors 20 is led to terminate at or proximal to a peripheral surface 104 of at least one tier 106. Conductor 20 (or fiber, fiber optic, channel, or other conveyance suited for the transmission of data or bandwidth, whether electrically or otherwise) is crimped to, or otherwise connected with, peripheral contact 102. Complementary conductors 20 are arranged peripherally and concentrically from complementary spring contacts 202 disposed in corresponding array around interior peripheral surfaces 204 of each corresponding inverted tier 206 in female connector 200.

Figure 9:
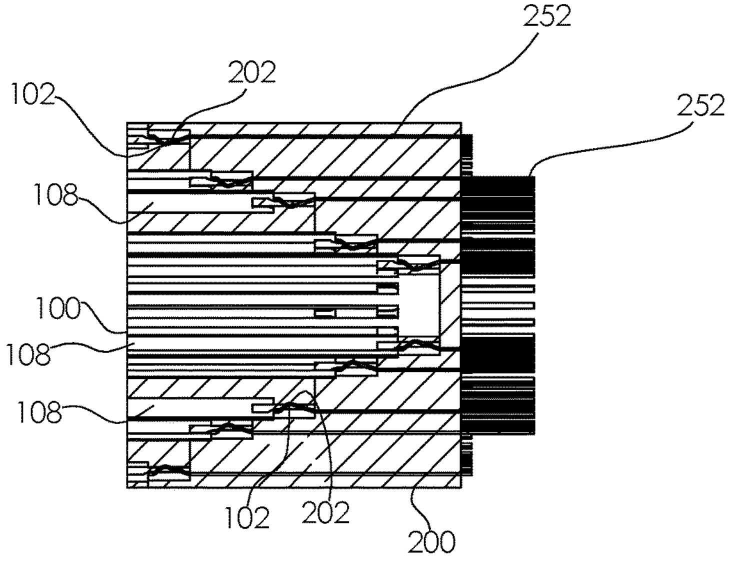
FIG. 9 is a side elevation view of a longitudinal section taken along a medial axis of the embodiment shown in FIG. 7.
Figure 10:
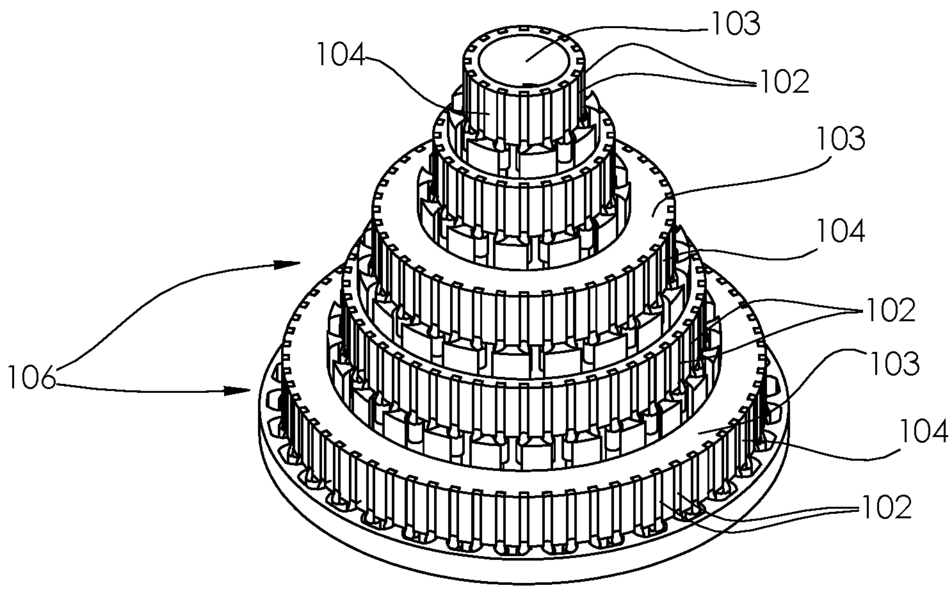
FIG. 10 is an elevation view of an example embodiment of a five-tiered male connector.
Figure 11:
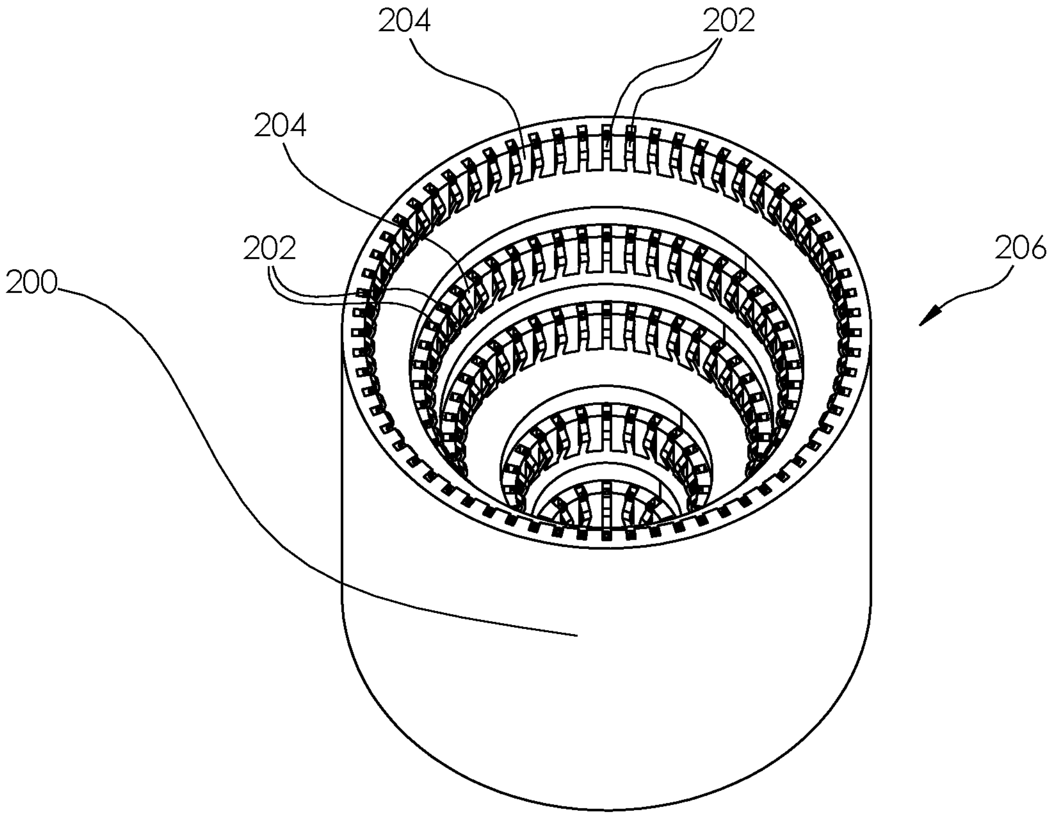
FIG. 11 is an elevation view of an example embodiment of a five-tiered female connector.
Figure 12:
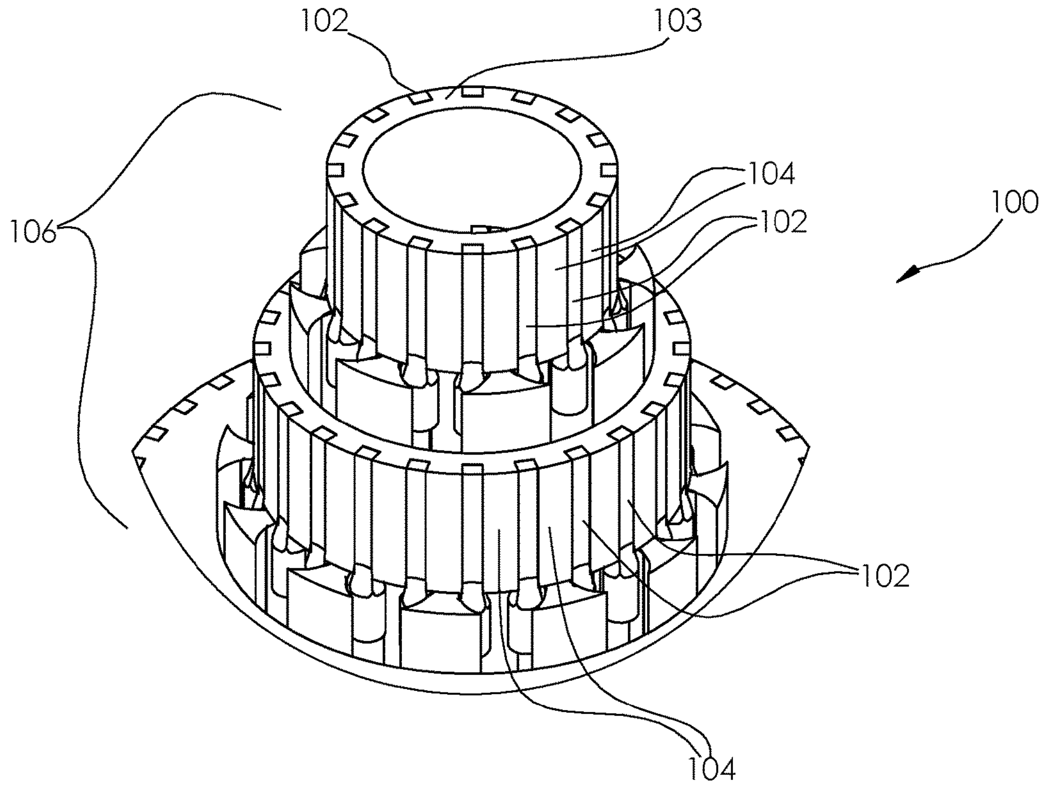
FIG. 12 is a detail view of a portion of the embodiment shown in FIG. 10.
Figure 13:
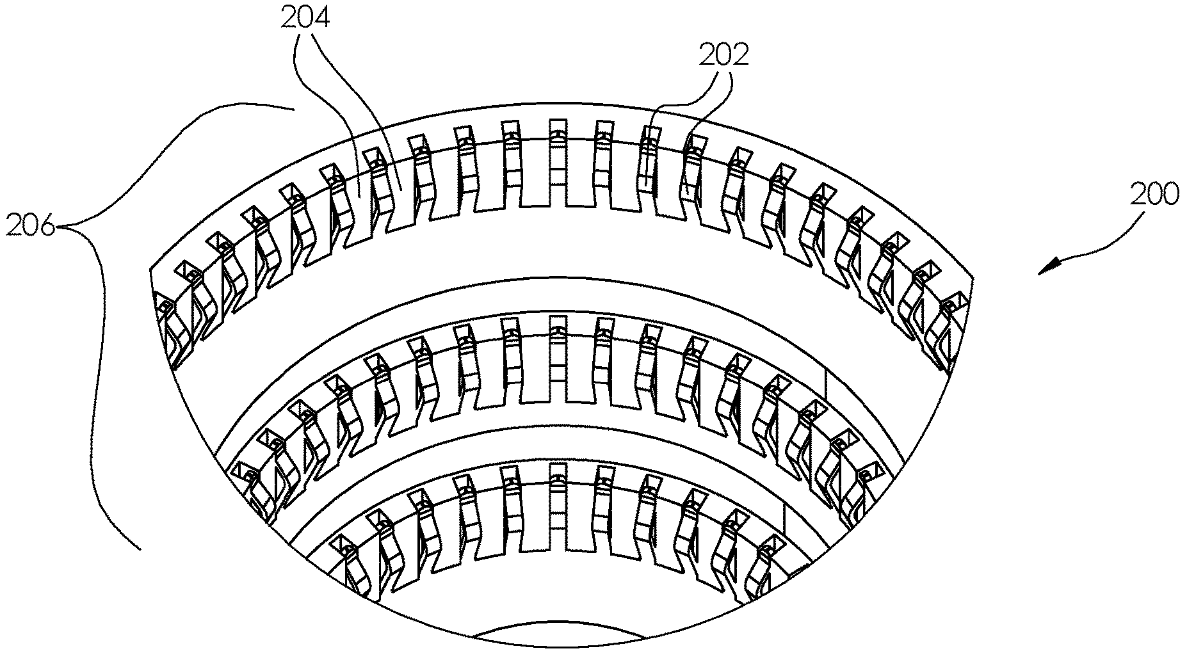
FIG. 13 is a detail view of a portion of the embodiment shown in FIG. 11.
Figure 14:
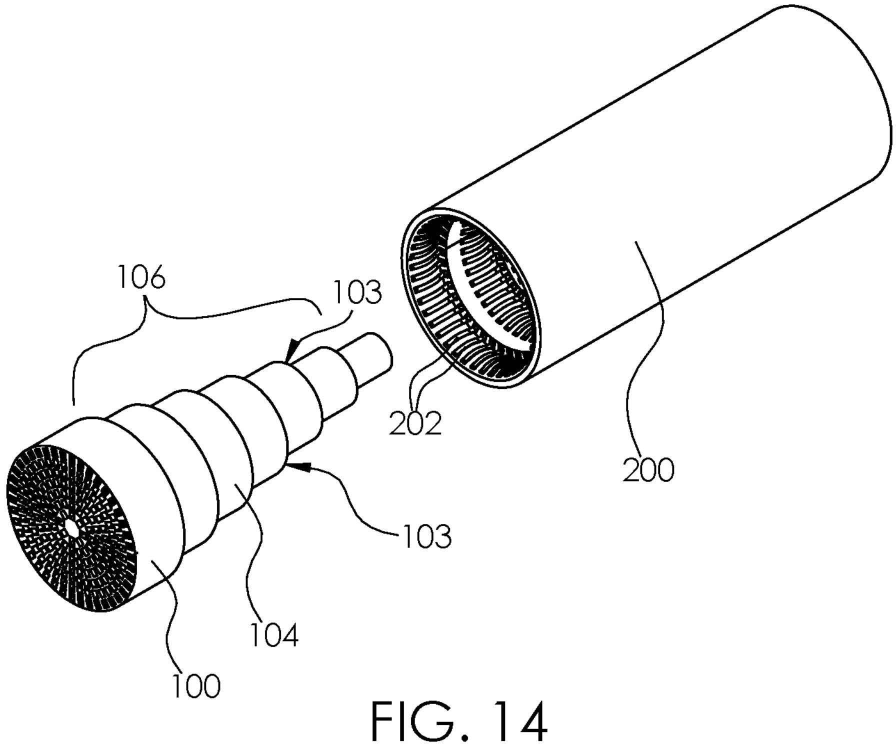
FIG. 14 is an elevation view of an example embodiment of a seven-tiered male connector about to be inserted into a seven-tiered female connector.
Figure 15:
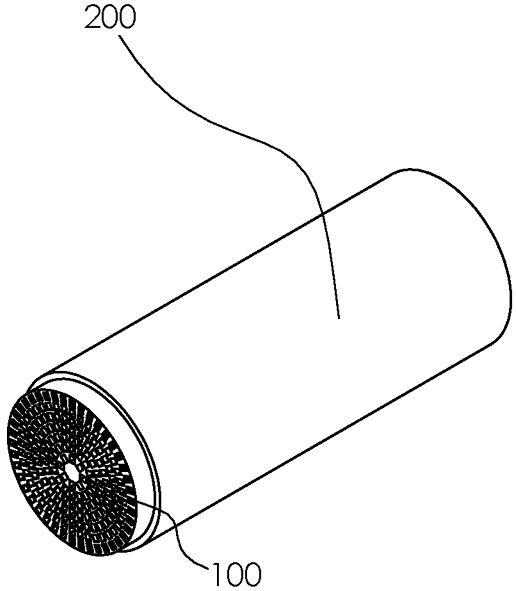
FIG. 15 is an elevation view of the embodiment shown in FIG. 14 with the male connector inserted into the female connector.
Figure 16:
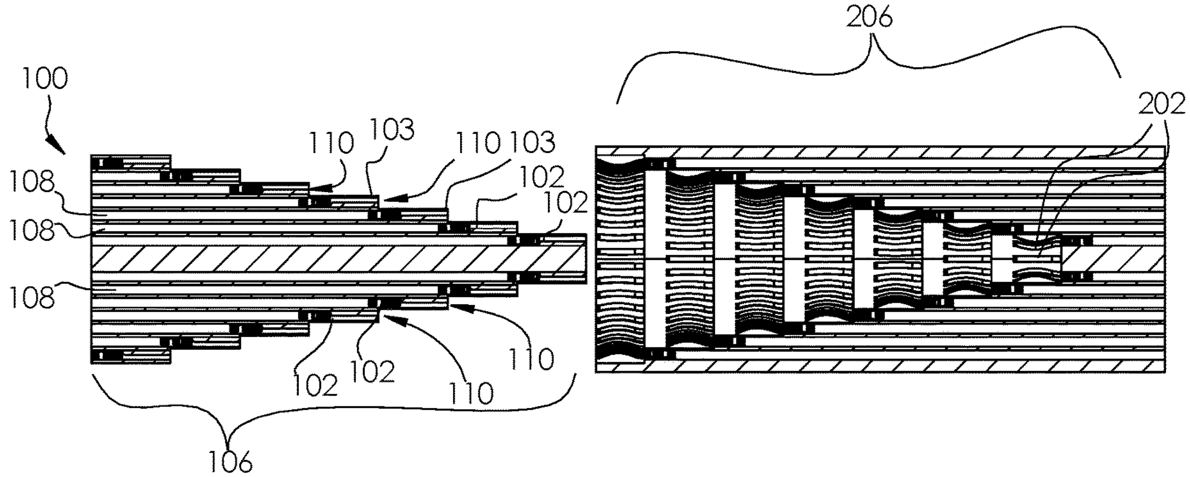
FIG. 16 is a side elevation view in longitudinal section taken on along a medial axis of the embodiment shown in FIG. 14.
Figure 17:
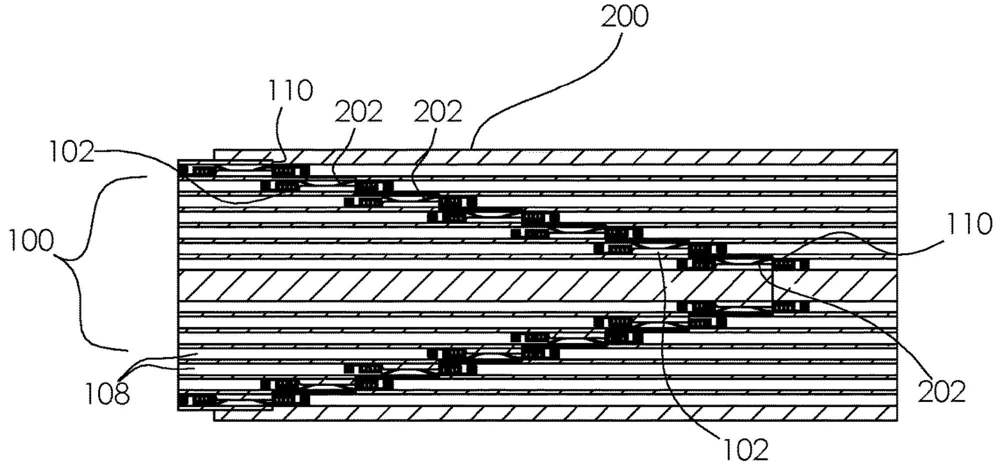
FIG. 17 is a side elevation view in longitudinal section taken on along a medial axis of the embodiment shown in FIG. 15.
Figure 18:
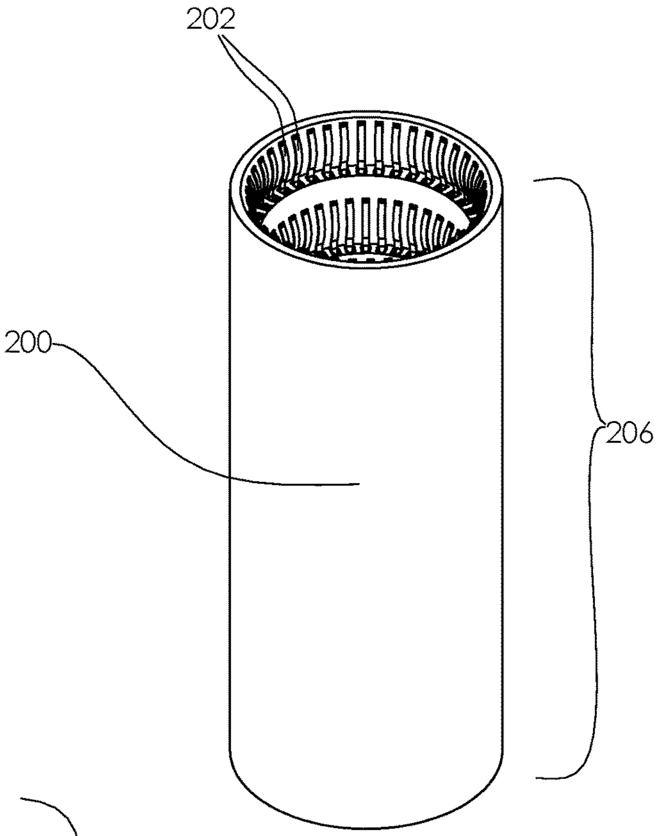
FIG. 18 is an elevation view of an example embodiment of the female connector shown in FIG. 14.
Figure 19:
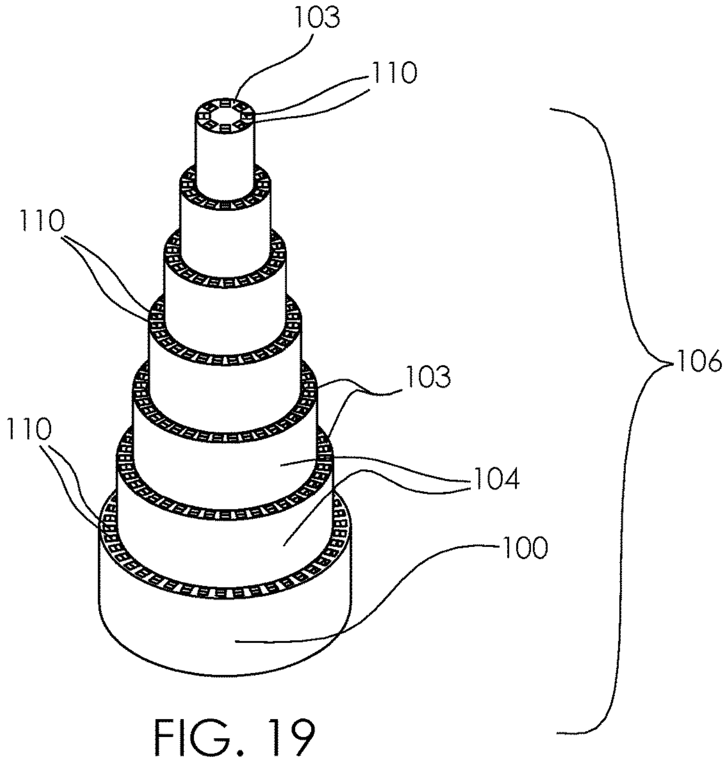
FIG. 19 is an elevation view of an example embodiment of the male connector shown in FIG. 14.
Figure 20:
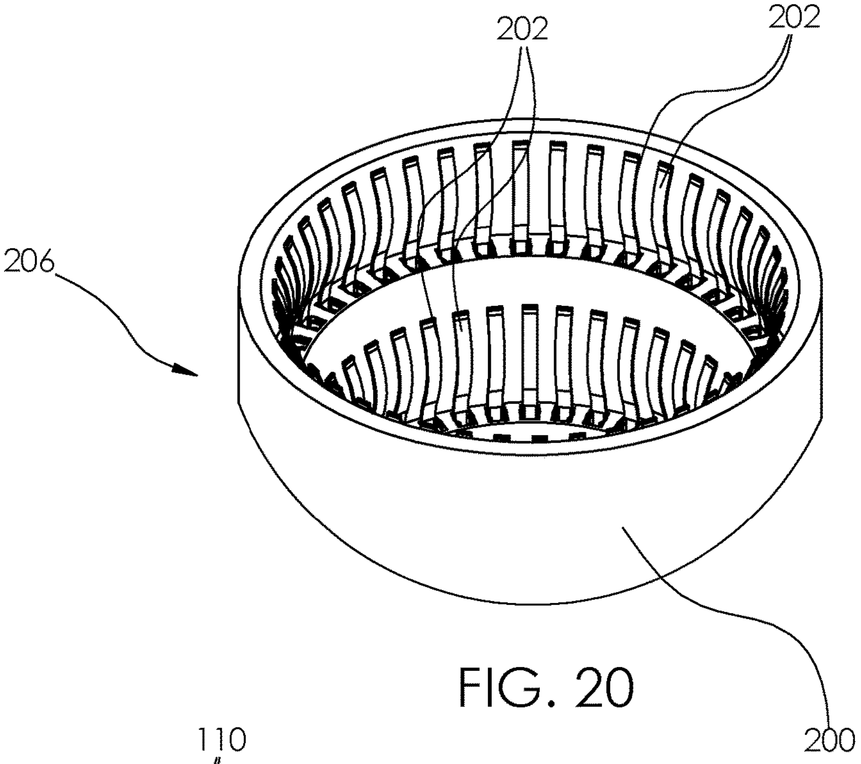
FIG. 20 is a detail view of a portion of the female connector shown in FIG. 18.
Figure 21:
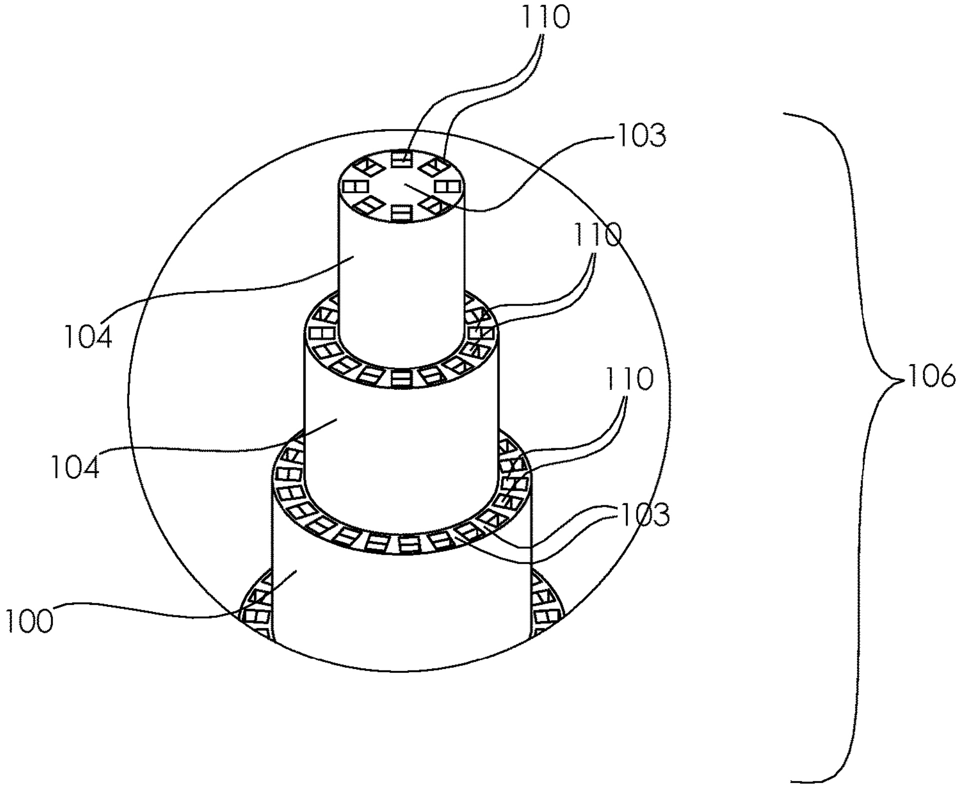
FIG. 21 is a detail view of a portion of the male connector shown in FIG. 19.
Figure 22:
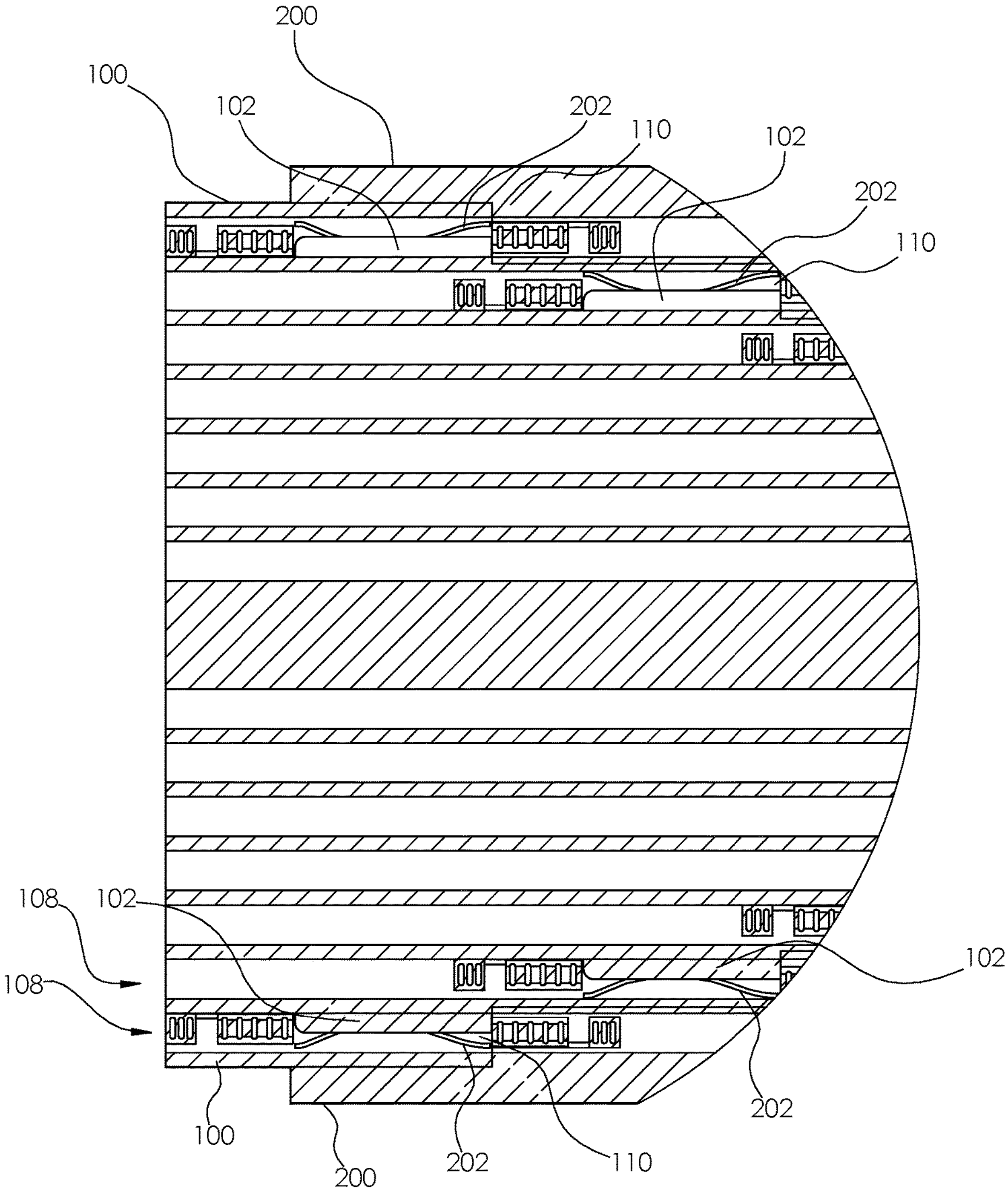
FIG. 22 is a detail view of the example embodiment shown in FIG. 15 wherein interconnection of the male and female connectors' contacts is shown.
Figure 23:
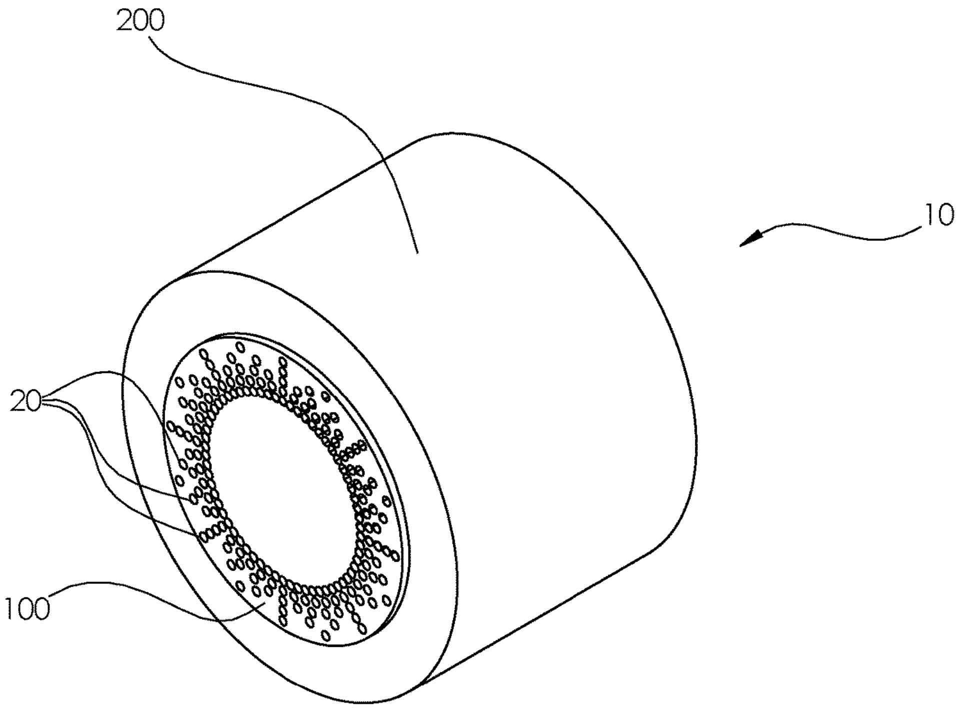
FIG. 23 is an elevation view of an example embodiment of a single-tiered concentric cable connector with the male connector inserted into the female connector.
Figure 24:
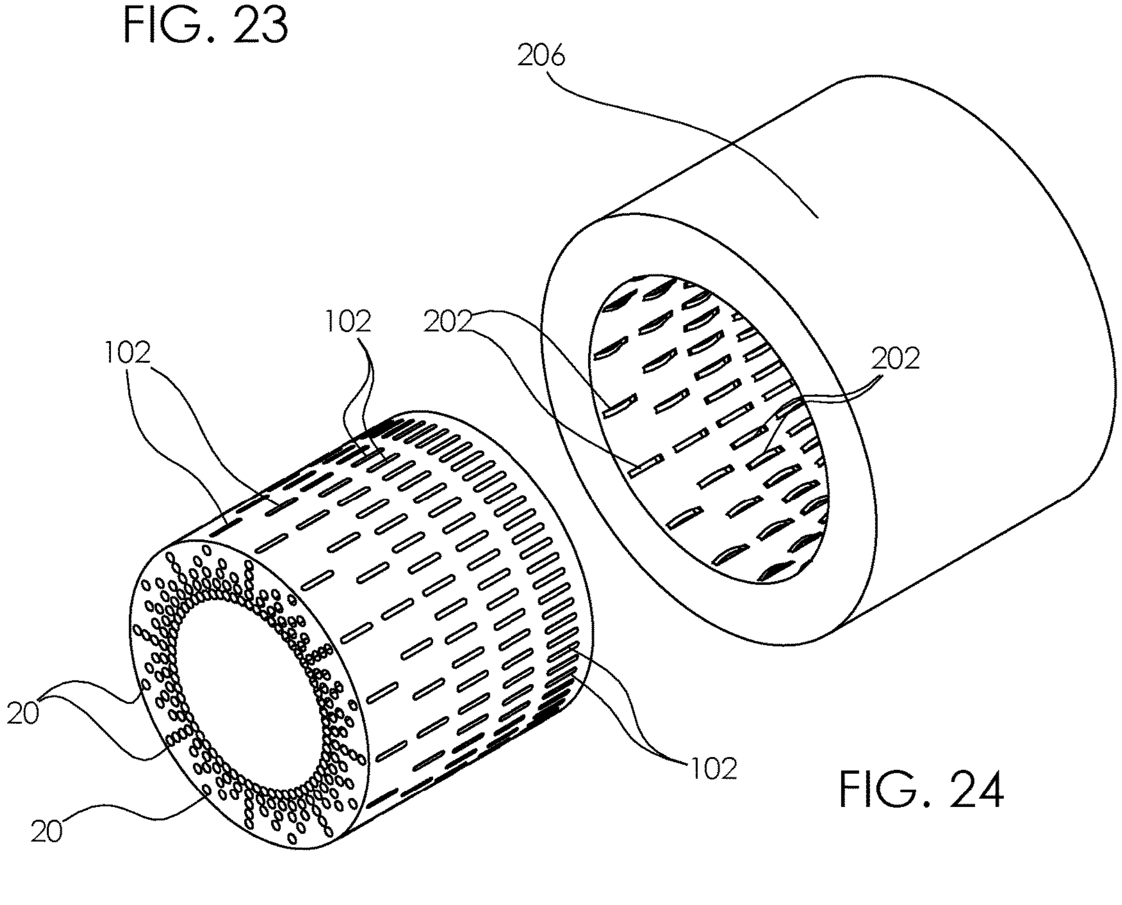
FIG. 24 is an elevation view of an example embodiment of the single-tiered concentric cable connector shown in FIG. 23 with the male connector disconnected from the female connector.
Figure 25:
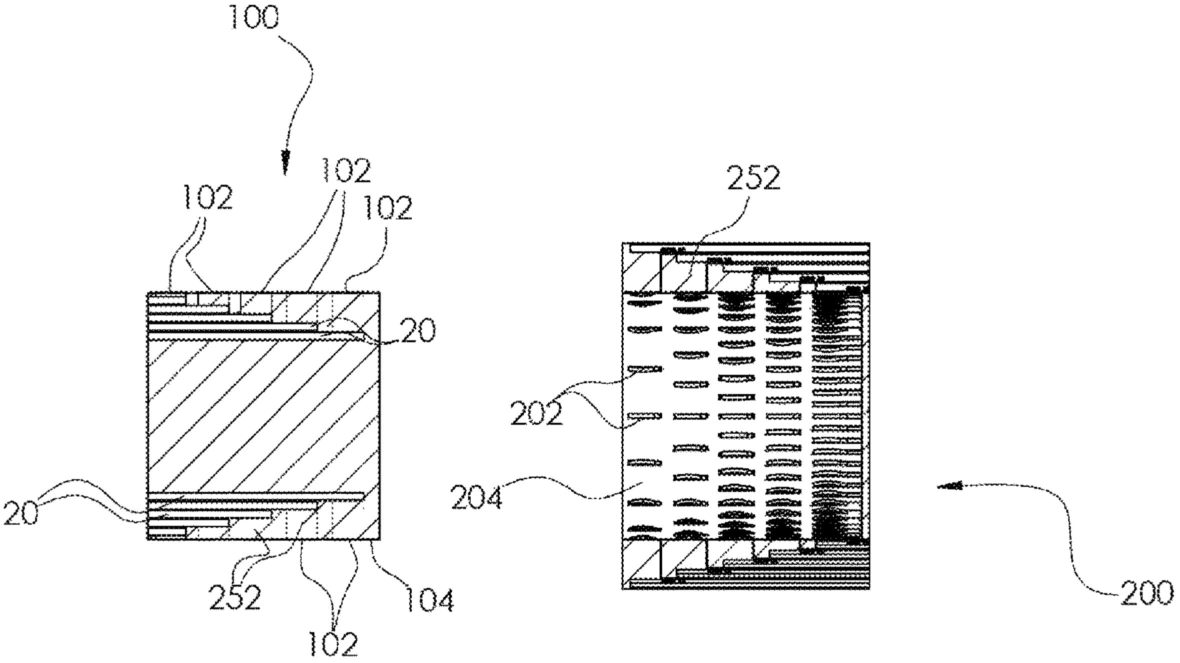
FIG. 25 is a side view of a longitudinal cross section taken along a medial axis of the embodiment shown in FIG. 24.
Figure 26:
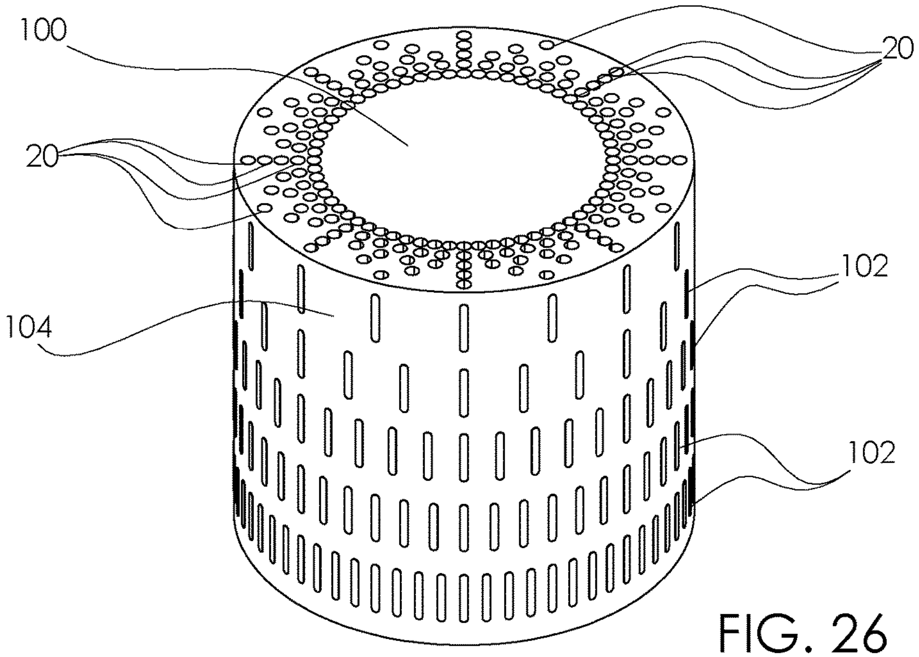
FIG. 26 is a detail view of an example embodiment of the male connector shown in FIG. 24.
Figure 27:
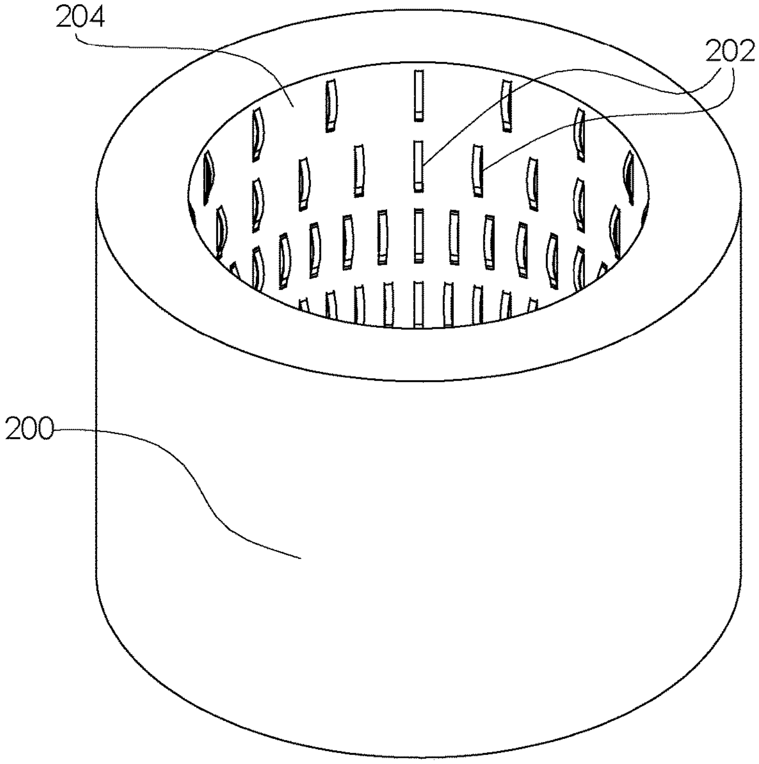
FIG. 27 is a detail view of an example embodiment of the female connector shown in FIG. 24.

FIG. 9 shows a side elevation view of a longitudinal cross section taken along a medial axis of the example embodiment depicted in FIG. 7. Here, male connector 100 is shown interconnected with female connector 200. Each spring contact 204 is therefore engaged against a corresponding peripheral contact 104 disposed in stepped array across the plurality of tiers 106. FIGS. 9 and 10 illustrate detail views of male connector 100 and female connector 200 exemplified in FIGS. 6 through 13. Any practical number of tiers 106, 206, of any shaped cross-section (e.g. square, rectangular, polygonal, etc.), is contemplated to be within scope of this disclosure.

FIGS. 14 through 21 illustrate an alternative example embodiment wherein spring contacts 202 disposed in female connector 200 are configured to be insertable into corresponding apertures 110 disposed upon anterior surfaces 105 of each corresponding tier 106 in male connector 100, wherein contact is effected between corresponding conductors 20 in male connector 100 disposed interior to each of a plurality of channels 108 therein.

In this embodiment, each spring contact 202 disposed within female connector 200 is projected anteriorly from connection with a corresponding conductor as a plurality of spring pins. See, e.g., FIG. 20. Male connector 100 includes anterior apertures 105 arranged around anterior surface 103 of each tier 106. See, e.g., FIGS. 19 and 21. Insertion of male connector 100 into female connector 200 aligns each of the plurality of spring pins 202 with a corresponding one of the plurality of anterior apertures 105, thereby guiding each said spring pin 202 into each corresponding channel 108 to connect with an associated interior contact 102 disposed terminating each conductor 20 interior to the male connector 100. See, e.g., FIGS. 16 and 17. See also FIG. 22. Since each channel 108 is insulating or nonconductive, possibility of cross channel connection or interference is minimized in this arrangement.

The example embodiment shown in FIGS. 23 through 27 contemplates an example embodiment wherein the conductors 20 are arranged in concentrically interior to a single tier comprising the connector 100, 200. In this example embodiment, contacts 102 disposed upon the terminus of each conductor 20 interior to male connector 100 vary in length, to bridge contact from each conductor 20 to the peripheral surface 104 of the connector 100. In this example embodiment, conductors 20 are arranged in concentric tiers interiorly, from an innermost tier 160 or ring to an outermost tier 162 or ring. Conductors 20 disposed around the innermost tier 160 connect with bridge contacts 102 that have maximum length. Conductors 20 disposed around the outermost tier 162 connect with bridge contacts 102 that have a minimum length. All bridge contacts 102 are disposed to connect or operationally communicate with spring contacts 202 complementarily disposed around the interior surface 204 of female connector 200.

Contacts 102, 202 are disposed along major axes in parallel along the length of each connector 100, 200. Thus, the connector 100, 200 may increase in length to accommodate more contacts 102, 202 between conductors 20 while maintaining a constant transverse dimension or diameter.

What is claimed is:

1. A cable connector comprising:

a male connector including;

a plurality of everted tiers disposed upon the male connector, said plurality of everted tiers having a decreasing transverse dimension from a maximum transverse dimension to a minimum transverse dimension;

a plurality of contacts disposed along or in parallel with a major axis of the male connecter, each of said contacts disposed about a peripheral surface of the plurality of everted tiers;

a female connector configured to matingly receive the male connector therein, said female connector including:

a plurality of inverse tiers disposed upon the female connector configured to matingly receive each of the everted tiers of the male connecter; and a plurality of contacts disposed along or in parallel with a major axis of the female connector and configured to complementarily engage against the plurality of contacts disposed upon the male connector;

wherein each of the plurality of contacts of the male connector is disposed interior to a corresponding channel having an aperture at a corresponding position upon an anterior surface of at least one tier, into which aperture a corresponding one of the plurality of contacts of the female connector slidingly engages when the male and female connectors are connected whereby interconnection of the plurality of contacts enables transmission of data across a plurality of channels.

2. The cable connector of claim 1 wherein the plurality of everted tiers and the plurality of inverted tiers are arranged concentrically.

3. The cable connector of claim 1 wherein the plurality of everted tiers and the plurality of inverted tiers are arranged concentrically.

4. A concentric cable connector comprising:

a male connector comprising at least one nonconductive everted tier, said male connector having each of a plurality of contacts arranged interior to each of a plurality of channels interior to the at least one nonconductive everted tier, each of said plurality of channels having an aperture disposed upon an anterior surface of the at least one nonconductive everted tier; and a female connector configured to matingly receive the male connector, said female connector comprising at least one nonconductive inverted tier configured complementarily to the at least one everted tier, said female connector having a plurality of spring contacts arranged around the perimeter or peripheral surface of the at least one nonconductive inverted tier in corresponding positions whereby each of the plurality of spring contacts slidingly engages through a corresponding one of the apertures interior to a corresponding one of the plurality of channels to connect with a corresponding one of the plurality of contacts of male connector when the male connector is inserted into the receiving member;

wherein the concentric cable connector enables interconnection of a plurality of contacts for transmission of data across a plurality of channels.

5. The cable connector of claim 4 wherein the plurality of everted tiers and the plurality of inverted tiers are arranged concentrically.

6. A cable connector comprising:

a male connector having a peripheral surface, said male connector comprising:

a plurality of conductors disposed interior to the male connector between an innermost position and an outermost position;

a plurality of first bridge contacts, each of said plurality of first bridge contacts having:

a contact surface disposed at or proximal to the peripheral surface;

a connection surface disposed connected to a corresponding one of the plurality of conductors;

a span configured between a minimum span and a maximum span, said span configured to connect the corresponding one of the plurality of conductors to the peripheral surface;

a female connector having an interior peripheral surface disposed around a lumen to a depth, said female connector comprising:

a plurality of conductors disposed interior to the female connector around the lumen between an innermost position and an outermost position;

a plurality of second bridge contacts disposed complementarily with respect to the plurality of first bridge contacts disposed upon the male connector, each of said plurality of second bridge contacts having:

a spring contact disposed at or proximal to the peripheral surface;

a connection surface disposed connected to a corresponding one of the plurality of conductors; and a span configured between a minimum span and a maximum span, said span configured to connect the corresponding one of the plurality of conductors to the peripheral surface;

wherein the male connector slidingly engages into the lumen of the female connector over the depth and the plurality of conductors interior to the male connector is connected to the plurality of conductors interior to the female connector via the plurality of first and second bridge contacts connecting in circumferential or perimetric configurations along parallel longitudinal axes.

* * * * *